July 7, 1942.  W. W. LANDSIEDEL  2,289,055
COMPUTING MACHINE
Filed May 25, 1939   7 Sheets-Sheet 1

INVENTOR
W. W. LANDSIEDEL
BY *H. R. Sparks*
ATTORNEY

July 7, 1942.  W. W. LANDSIEDEL  2,289,055
COMPUTING MACHINE
Filed May 25, 1939  7 Sheets-Sheet 3

FIG. 3

INVENTOR
W. W. LANDSIEDEL
BY *H. A. Sparks*
ATTORNEY

INVENTOR
W. W. LANDSIEDEL
BY *W. A. Sparks*
ATTORNEY

July 7, 1942.    W. W. LANDSIEDEL    2,289,055
COMPUTING MACHINE
Filed May 25, 1939    7 Sheets-Sheet 6
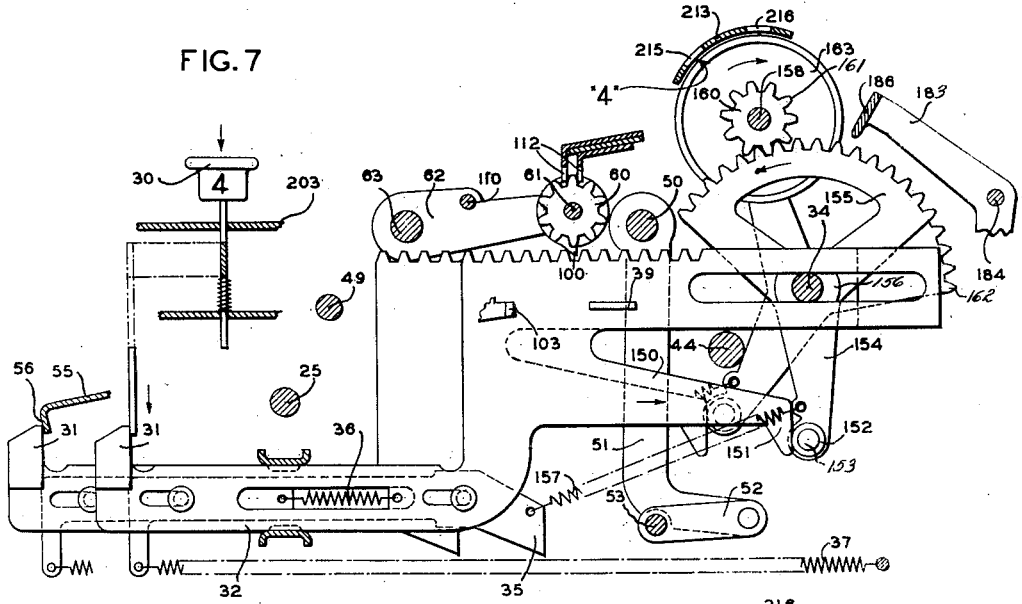
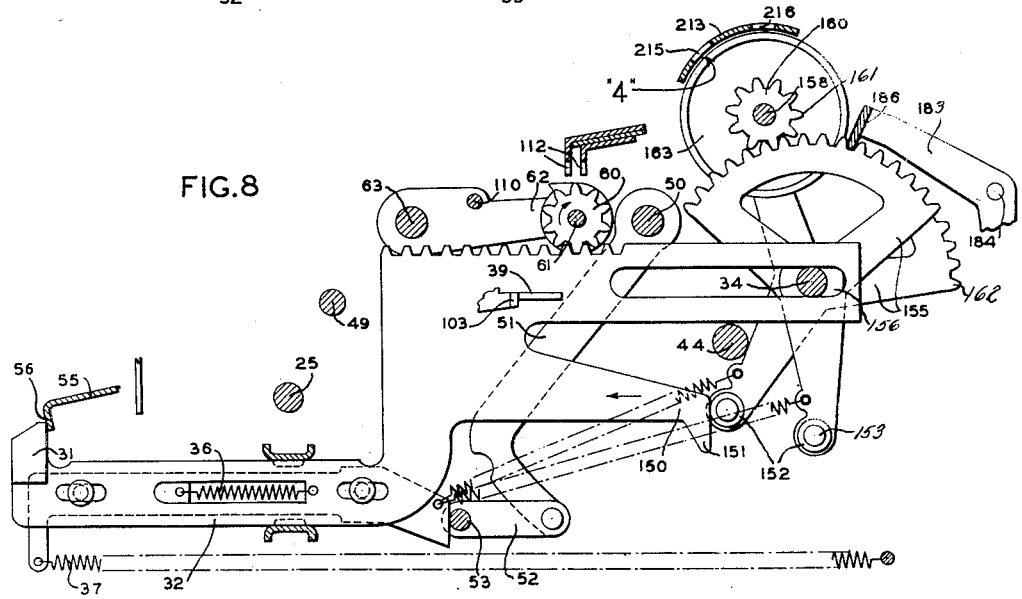
INVENTOR
W. W. LANDSIEDEL
BY H. A. Sparks
ATTORNEY July 7, 1942.  W. W. LANDSIEDEL  2,289,055
COMPUTING MACHINE
Filed May 25, 1939   7 Sheets—Sheet 7
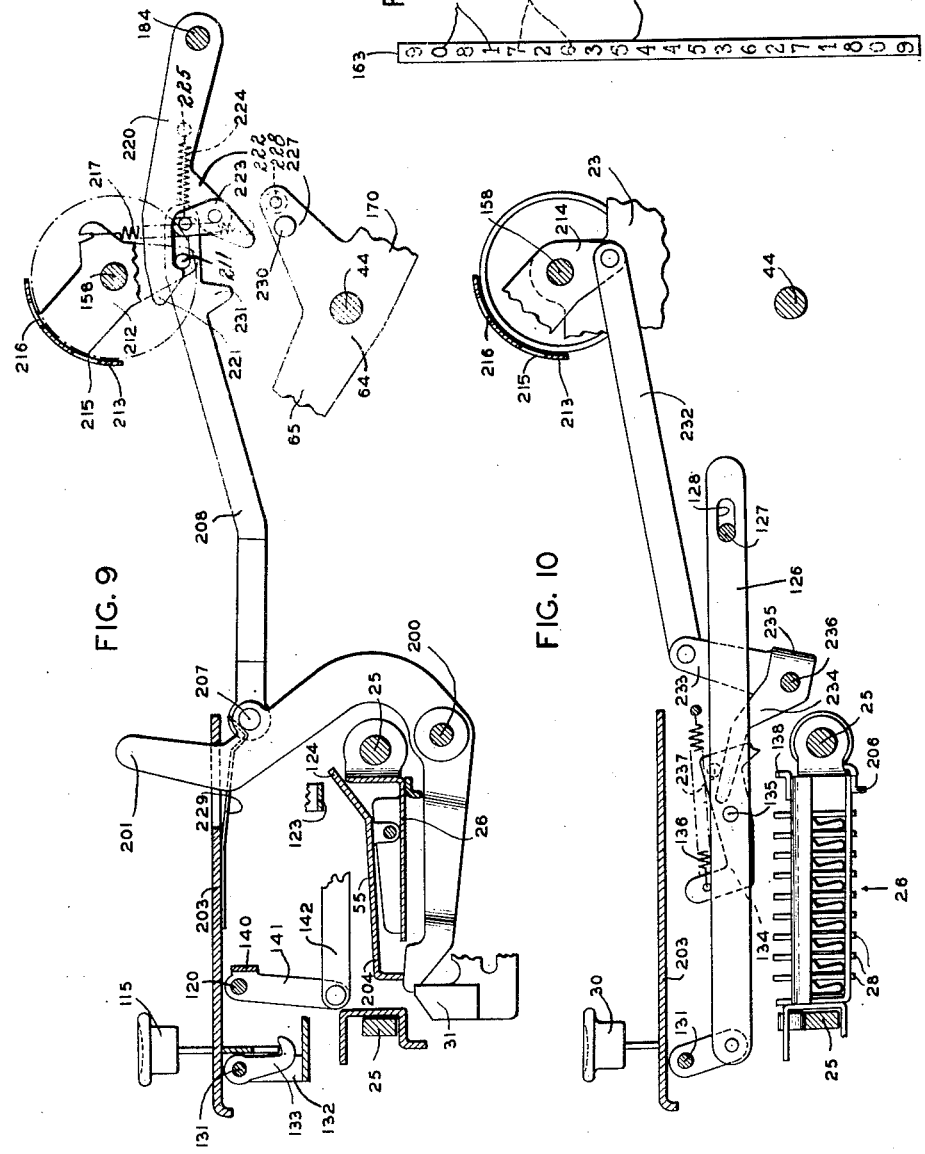
INVENTOR
W. W. LANDSIEDEL
BY H. A. Sparks
ATTORNEY Patented July 7, 1942

2,289,055

UNITED STATES PATENT OFFICE 2,289,055

COMPUTING MACHINE

Walter W. Landsiedel, Elmira, N. Y., assignor to Remington Rand Inc., Buffalo, N. Y., a corporation of Delaware Application May 25, 1939, Serial No. 275,603

4 Claims. (Cl. 235—79)

This invention relates to computing machines of the ten key type, and more particularly to an extremely simple and inexpensive non-listing, adding and subtracting machine for use where the nature of the work to be done does not require a printed record.

The present invention is shown embodied in an adding machine of the type shown in the U. S. Patents 1,899,444 and 1,835,170 to Thomas O. Mehan, issued April 19, 1938 and December 8, 1931, respectively. While the features of the present invention were designed primarily for use in the above machine, and may be readily incorporated therein without materially modifying the existing structural features thereof, it will be understood that this invention is not restricted to the embodiment in such machine but may be included in computing machines generally.

The machine shown and described in the above mentioned patents is of the portable type in which addition is accomplished by setting up an amount in the usual traveling pin carriage and then, through the actuating racks, transferring the amount set up in the carriage into the accumulator. A total may then be taken after a blank stroke of the machine during which total operation the accumulators are cleared. The above machine has contained therein printing instrumentalities which print items at each adding operation. It has been found that the above printing unit is of such complex construction as to increase the cost of the machine considerably. Therefore, in order that the above machine may be made so that it can be used in small offices, homes and places of business, where the nature of the work to be done does not warrant the purchase of a machine of the listing type, the printing unit and its associated mechanism has been eliminated.

However, in order that the operator of the above machine may be able to see each item (or the last item) entered into the accumulator, a register is provided which is of simple and novel construction.

The register in accordance with the invention includes a plurality of item dials having two sets of figures thereon, black for addition and red for subtraction. These dials are equal in number to the accumulator pinions and through corresponding gear sectors they are actuated in the following manner:

Upon the forward stroke of an adding operation, the actuating racks which are permitted to move to the rear of the machine by the set-up in the pin carriage, will, through the gear sectors, set up a corresponding amount in the item dials, thereby enabling the operator to see, through a window in the casing, the item set up on the keyboard.

The amount is entered in the accumulator in the usual manner during the return stroke of the machine.

At the beginning of the next adding operation the item dials are released from the previous set-up and are permitted to return to normal position. But, the actuating racks moved by the new set-up in the pin carriage engage their corresponding sectors which will rotate the item dials, thereby registering the new amount set up on the keyboard. Upon taking a blank stroke of the machine the item dials are restored to normal.

In taking a total the actuating racks which move toward the rear of the machine operate the item dials in the same manner described thereby registering a total which is visible through the window in the casing.

Provision is made in the present machine to simply and conveniently perform problems in subtraction by complementary addition.

This is accomplished by setting up on the keyboard the complement of the amount to be subtracted, and depressing the subtract key.

Depression of the subtract key conditions the machine to add nine to each order to the left of the highest significant order of the subtrahend by raising a restraining plate.

The subtract key is connected to a dial shield or shutter which has formed therein two elongated slots through which the red and black figures on the item dials are visible. The construction is such that with the machine conditioned for adding the black figures on the item dials are visible and with the machine conditioned for subtraction, i. e., the subtract key in its operated position, the red figures on the dial are visible, which red figures represent the subtracted amount or the negative total.

An object of this invention is to visibly register each positive or negative amount entered into the accumulator.

Other objects and structural details of the invention will be apparent from the following description when read in connection with the accompanying drawings, wherein:

Fig. 3 is a right-hand sectional elevation taken along the line 3—3 of Fig. 1;

Fig. 7 is a right-hand sectional detail view showing the adding racks and associated mechanism in a position at the end of the forward stroke with the number "four" key depressed;

Fig. 8 is a right-hand sectional detail view of the mechanism shown in Fig. 7 at the end of the return stroke with the item dials registering the amount "four";

Fig. 9 is a right-hand detail view partly in section of the subtract key in operated position;

Fig. 10 is a right-hand detail view partly in section of the "blank stroke" lock mechanism in the position it assumes when the subtract key is operated; and Fig. 11 is a plan view in development of an item dial showing the two sets of figures thereon.

Figure 1:
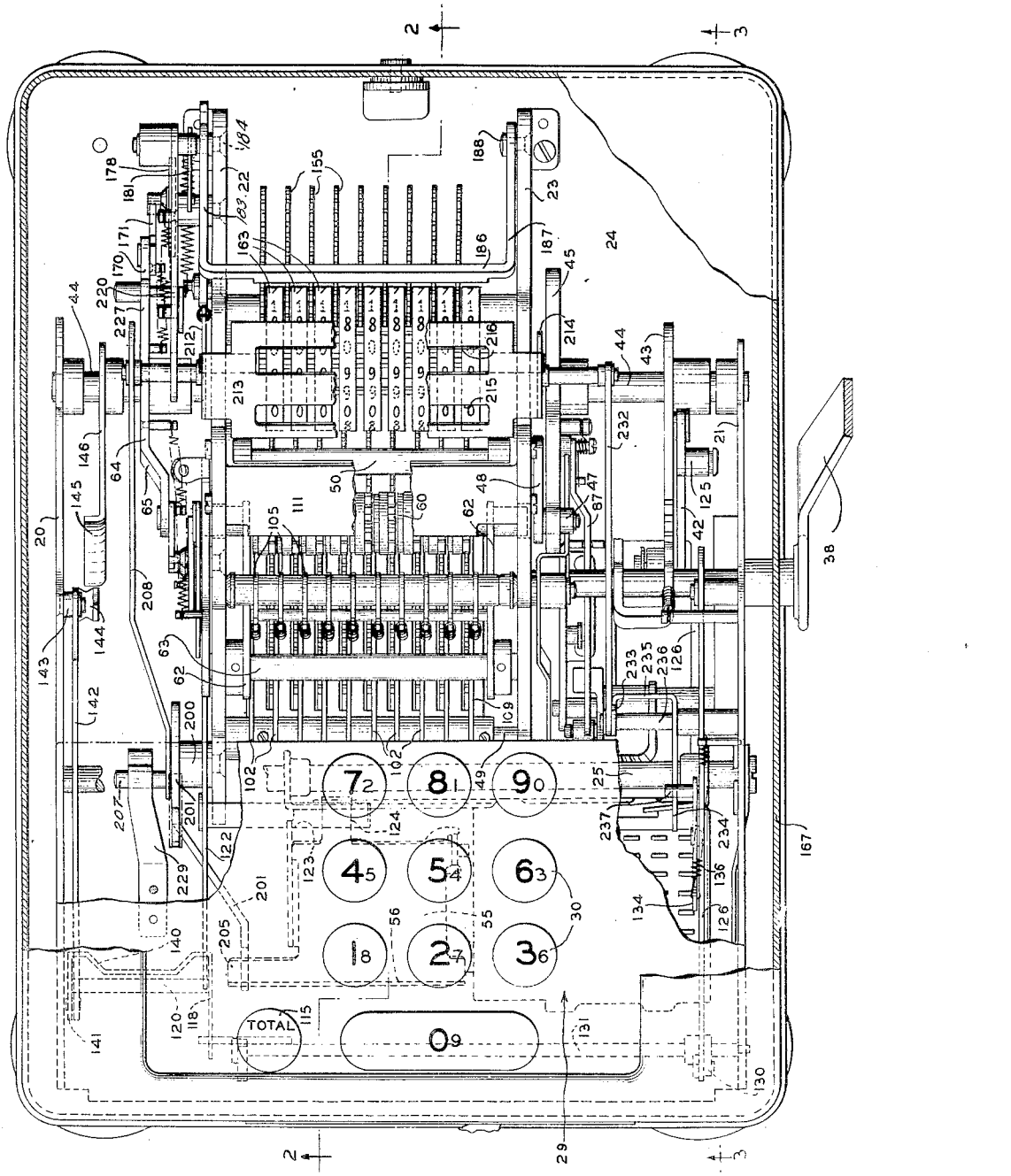
Fig. 1 is a top plan view of the machine with the cover partly broken away to show the item dials, the subtract key and their associated mechanisms.

FRAMES, SET-UP, AND MAIN OPERATING MECHANISM (Figs 1, 2, 3, and 6)

The frame of the machine comprises outer side plates 20 and 21, and inner plates 22 and 23, said plates being suitably united and secured to a base 24. A pair of guide rails 25 supported at their ends in outer plates 22 and 23 support and guide a pin carriage generally designated 26. This pin carriage is adapted to travel step-by-step transversely of the machine under control of an escapement mechanism designated as a whole by the reference numeral 27 (Fig. 3). The operation of the escapement mechanism is fully described in the above mentioned Patent 1,899,444, and need not be further described herein. The carriage 26 supports pins or stops 28 mounted for movement thereon from an elevated ineffective position to a lowered effective position by digit keys 30 mounted upon the keyboard of the machine generally designated by reference numeral 29. When each selected pin or stop 28 is depressed to effective position, it is interposed in the path of an aligned stop or ear 31 carried on an associated adding or actuating rack 32, there being nine in the present machine. The racks 32 extend upwardly and rearwardly and are guided for sliding movement by a comb 33 and a rod 34 fixed intermediate the inner plates 22 and 23. Mounted upon the lower portion of each adding rack 32 by a pin and slot connection is a slide 35. The rack and slide are connected by a spring 36 for the purpose of transfer and are urged toward the rear of the machine by a spring 37.

The machine is shown as hand-operated by a crank handle 38 (Fig. 1) which is removably secured to a stub shaft 40 journaled in bearings suitably secured to base 24. However, it is obvious that the shaft 40 may be power actuated. Secured to shaft 40 is an arm 41 which has suitable stop portions to limit the degree of oscillation of the shaft. A link 42 pivotally connects the arm 41 with a full stroke sector 43 which is secured to a main shaft 44 journaled in outer and inner plates 20, 21, 22, and 23. A spring not shown urges the shaft 44 clockwise.

Figure 2:
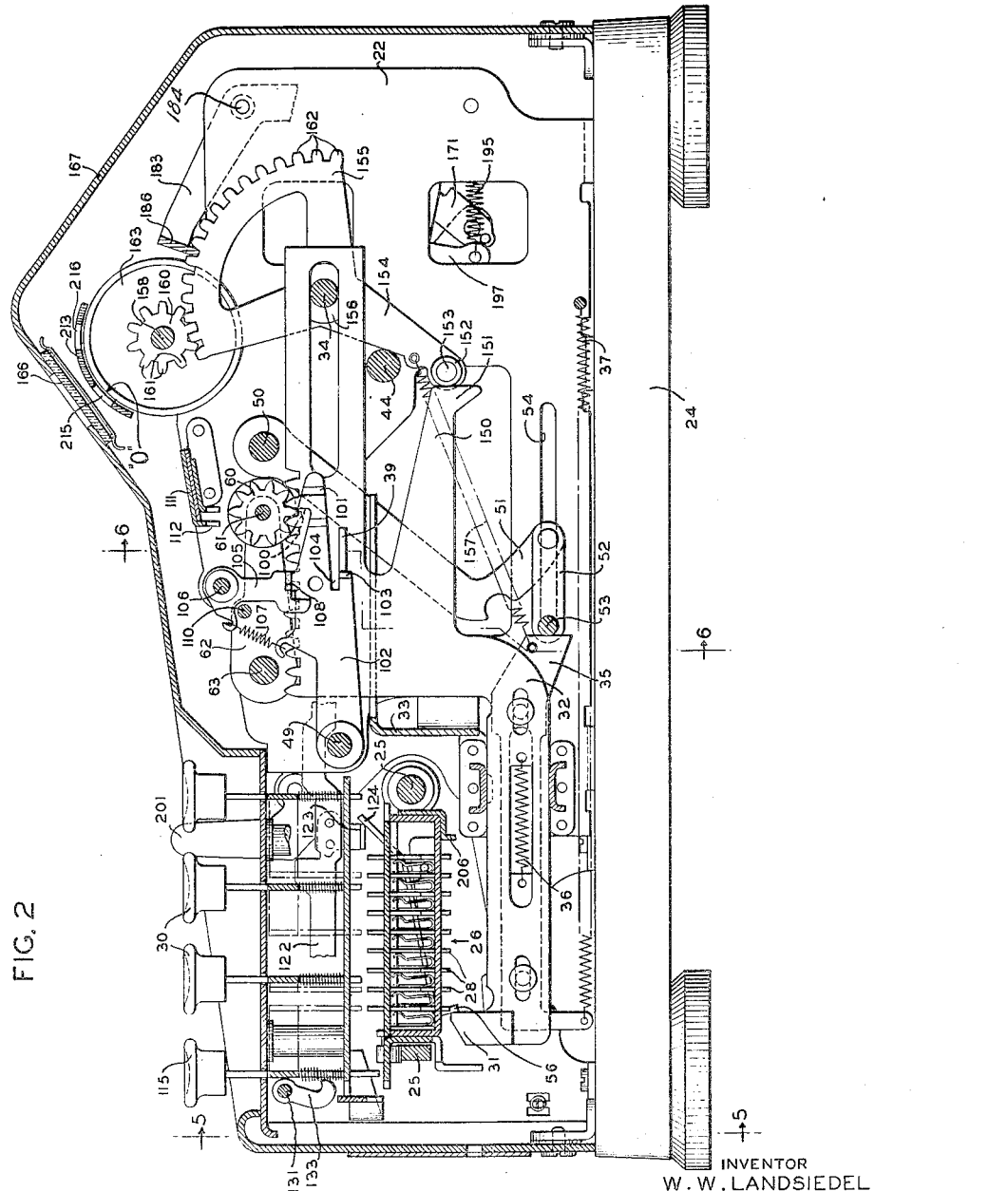
Fig. 2 is a right-hand sectional elevation taken along the line 2—2 of Fig. 1.

Secured to the shaft 44 is a cam plate 45 having a cam slot 46 which is adapted to receive a roller 47 on an arm 48 fixed to a shaft 50 (Fig 3). The shaft 50 is journaled in the inner frame plates 22 and 23 and has secured thereon a pair of downwardly extending arms 51 (Fig. 2). The arms 51 each have a forwardly extending link 52 connected thereon which links are connected at their forward ends by a bail 53 adapted to ride in horizontal slots 54 formed in frame plates 22 and 23. The bail 53 bears against the slides 35, thus holding the racks 32 toward the front of the machine. The construction of the above mechanism is such that as the handle 38 is rocked counter-clockwise the sector 43 and the plate 45 are rocked in the same direction through link 42 and arm 41. The rocking of the plate 45 rocks the arm 48, through the slot 46 and roller 47, counter-clockwise resulting in moving the bail 53 toward the rear of the machine, thereby permitting the racks 32 and slides 35 to move rearward until arrested by the stops 28, which have been set by the keys. In order to prevent the rearward movement of the racks of higher denominational order than those corresponding to the set-up made by the digit keys a restraining plate 55 is provided which is pivotally mounted upon the carriage 26. This plate 55 is formed at its forward end with a stop portion 56, which normally lies in the path of the ears 31 so as to prevent the rearward movement of the racks 32. Upon each operation of the digit keys the plate 55 moves one step to the left as viewed from the front of the machine and moves the stop 56 out of the path of the ears 31 corresponding to the orders set by the keys. It is, therefore, seen that upon the forward movement of the handle 38 only the racks that do not lie in the path of the stop will move rearward. Upon the return stroke of the handle the bail 53 is moved toward the front of the machine to return the slides and racks to normal position.

ACCUMULATOR SHIFTING MECHANISM (Figs. 1, 2, 3, and 4)

The accumulator consists of a plurality of ten-toothed pinions 60, one for each denominational order, which are rotatably mounted upon an accumulator shaft 61 carried by a pair of arms 62. The arms 62 are pinned to a shaft 63 journaled in the inner frame plates 22 and 23 (Figs. 1 and 2) so that when the shaft 63 is rocked the pinions 60 will be brought into and out of engagement with teeth formed on the adding racks 32.

The machinsm for rocking the shaft 63 will now be described. Rigidly secured to the left-hand end of the shaft 44 (Figs. 1 and 4) is a lever 64 having a forwardly extending arm 65 at the end of which is pivotally mounted a double acting wipe pawl 66. A spring 67 having one end connected to a pin on the arm 65 and the other end to the wipe pawl 66 tends to keep a finger 68, formed on the pawl, pointing outwardly in the direction of the arm 65. Shoulders 70 and 71 are formed in the wipe pawl 66 which are adapted to alternately engage pins 72 and 73, respectively. The pins 72 and 73 are set in a plate 74 which is carried by a stud 75 screwed into the inner frame 22. Pins 76 and 77 set in the inner side of plate 74 are adapted to engage in respective notches 78 and 80 formed in a plate-like link 81 pivotally connected to an arm 82. The arm 82 is secured to the shaft 63 which, it will be recalled, upon rocking, will shift the accumulator into and out of mesh with the adding racks 32. A spring 83 having one end connected to the link 81 and the other end to the arm 82 tends to keep the notch 79 of link 81 in engagement with the pin 76 which is in the position assumed in normal adding operations. The arm 82 has a wedge-shaped end which is adapted to enter either of two notches 83 and 84 formed in a locking arm 85 pivoted on a stud secured to the frame plate 22. A spring 86 serves to hold the locking arm in engagement with the arm 82.

The construction is such that the accumulator pinions 60 which are normally in mesh with the adding racks 32 are raised out of mesh during the initial part of a forward stroke in the following manner. Upon clockwise movement of the arms 65 (Fig. 4) the shoulder 70 engages the pin 72 and forces the plate 74 clockwise which latter movement is communicated to the shaft 63 through the pin 76, link 81 and arm 82. The wedge-shaped end of the arm 82 cams the locking arm 84 counter-clockwise against the tension of the spring 86 and engages in the notch 84, thereby locking the pinions 60 out of engagement with the racks 32.

During the initial part of the return stroke of the handle the shoulder 71 of the wipe pawl engages the pin 73 of plate 74, thereby rocking the arm 82 counter-clockwise to move the pinions 60 into mesh with the adding racks 32.

CARRIAGE RETURN (RESTORING MECHANISM)

Figure 5:
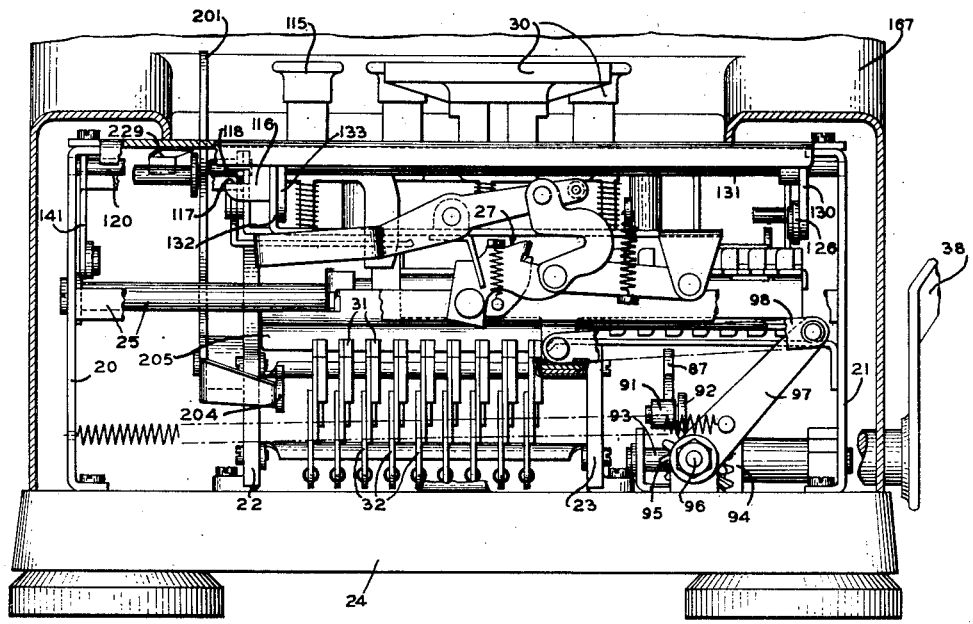
Fig. 5 is a front sectional elevation taken along the line 5—5 of Fig. 2.
Figure 6:
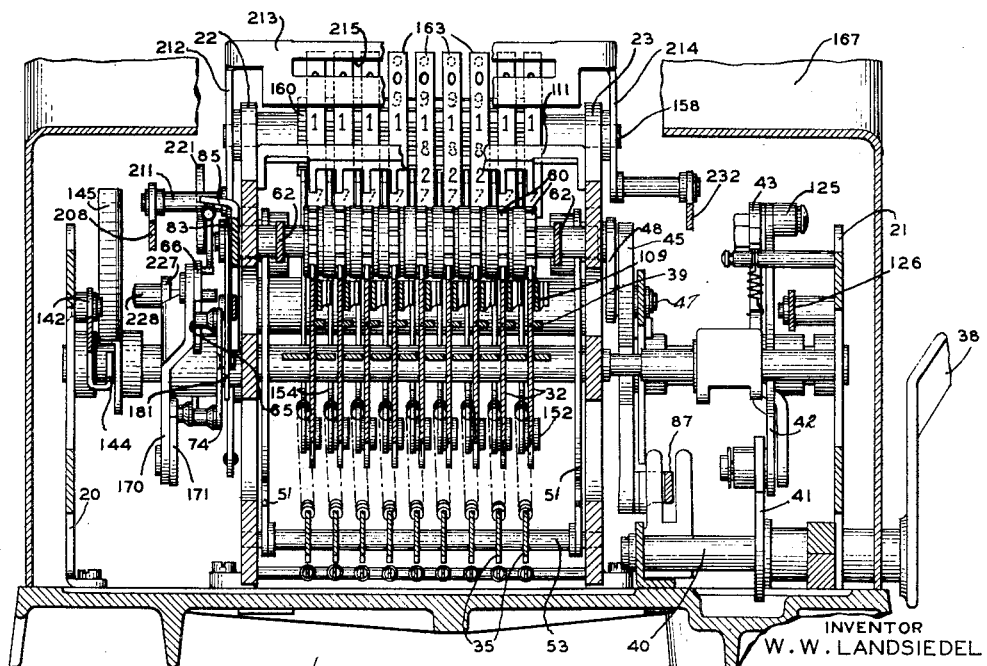
Fig. 6 is a front sectional elevation taken along the line 6—6 of Fig. 2.

(Figs. 3 and 5)

The mechanism for returning the pin carriage 26 is substantially the same as that shown and described in the above mentioned Patent 1,899,444. Connected to a depending arm on the cam plate 45 (Fig. 3) is a forwardly extending arm 87 which is resiliently urged counter-clockwise by a spring 88. This arm 87 has formed at its forward end a notch 90 adapted to engage a roller 91 on an arm 92 fixed to a short shaft 93 journalled in bearings suitably secured to base 24. The arm 92 has formed integral therewith a lug which is adapted to cooperate with the arm 87. Also fixed to the shaft 93 is a bevel gear sector 94 which meshes with a bevel gear 95 secured to a shaft 96 which shaft is connected to the pin carriage 26 by an arm 97 (Fig. 5), fixed to said shaft, and a link 98.

The construction is such that near the end of the return stroke of the handle 38 the notch 90 of the arm 87 engages the roller 91 of the arm 92 rocking the arm in a counter-clockwise direction (Fig. 3). This rotates the shaft 96 in a clockwise direction (Fig. 5) through the medium of shaft 93, gear sector 94, and gear 95. Rotation of the shaft 96 restores the carriage 26 to the right through arm 97 and link 98. The lug formed on the arm 92 serves to disengage the notch 90 from the roller 91 at the completion of the carriage return operation.

TRANSFER MECHANISM (Figs. 2 and 7)

The transfer or carrying mechanism is of the type shown and described in the above mentioned Patent 1,899,444 in which the adding rack of the order into which a transfer is to be made is permitted to move an additional distance beyond normal to rotate its associated accumulator pinion an additional step.

Each pinion 60 (Figs. 2 and 7) carries a lug 100 which, when the pinion passes from nine to zero, contacts with the cam surface 101 (Fig. 2) of a transfer pawl or arm 102 associated with the rack of the next higher denominational order, and depresses it sufficiently to permit a lug 39, formed on the rack, which normally is stopped by the end surface 103 of the arm 102, to enter notch 104. The transfer arms 102 are rotatably mounted upon a shaft 49 which is supported upon the inner frame plates 22 and 23. Latch 105 pivotally mounted on a shaft 106 is resiliently urged counter-clockwise by means of a spring 107 which at one end is attached to an ear on said latch and at the other end to an ear on the transfer arm 102. This spring 107 tends not only to swing the latch about its pivot but also to hold the arm 102 in raised position. The arm 102 has a lug 108 formed thereon which is normally in engagement with a notch on latch 105. When the transfer arm 102 is depressed by the lug 100 the latch 105 will swing counter-clockwise and the lug 108 will engage a lower notch on latch 105 holding the arm 102 depressed. A restoring bail 110 supported by the arms 82 restores the arms 102 at the beginning of each adding stroke of the machine. An aligner 111 has depending prongs 112 which are engaged by the pinions 60 to locate them in their correct position and prevent accidental rotation when they are not in mesh with the adding racks 32.

THE TOTAL TAKING AND TOTAL KEY INTERLOCKING MECHANISM (Figs. 1, 2, 3, 4, and 5)

The total taking and total key interlocking mechanisms are substantially the same as shown and described in the above mentioned Patent 1,835,170.

A total key 115 mounted for vertical movement in the keyboard 29 has projecting from the stem thereof an arm 116 (Fig. 5) which is slotted horizontally at 117 to receive an arm 118 (Fig. 4) of a bell-crank lever 119. The lever 119, pivotally mounted on a rod 120, has a second arm 121 which has connected thereon the forward end of a link 122. This link extends rearwardly and is connected to the link 81. It will be seen that upon depressing the total key 115 the link 81 is moved toward the rear of the machine thereby engaging notch 80 with pin 77. As has been described during adding operations the pinions 60 are out of engagement with the racks 32 on the forward stroke of the handle 38 and are moved into mesh with the racks during the return stroke. However, when the total key is depressed the pinions 60 remain in mesh during the forward stroke and move out of mesh upon the return stroke.

The link 122 has secured thereon a finger 123 which overlies an upturned lug 124 formed on the restraining plate 55. The construction is such that when the total key 115 is depressed the finger 123 engages the lug 124 of plate 55 thereby raising the stop portion 56 of the plate above the stops 31 of racks 32.

A transfer in the accumulator is effected when the transfer lug 100 rocks the arm 102 to permit the adding rack 32 of the next higher denominational order to move toward the front of the machine a distance of an additional tooth space. When the arm 102 is so rocked it is latched in that position by the latch 105. The above transfer operation takes place near the end of the return stroke of an adding operation, but the racks and transfer arms that have been operated are not restored until the start of the following machine cycle. It is obvious, therefore, that before a total can be taken the arms 102 and racks 32 which have been operated through a transfer operation, must be restored to normal position as shown in Fig. 2 so that the hook formed on arm 102 will engage lug 100 to limit the rotation of its associated pinion when the accumulator is cleared on the forward stroke of the handle 38. To this end a "blank stroke" of the operating handle is required before the total taking operation can be initiated. The mechanism for accomplishing this result in the present machine is as follows:

Referring to Figs. 1, 3, and 5 the upper end of link 42 has mounted thereon a roller 125 which is adapted to engage the rear end of a forwardly extending link 126 near the end of the forward stroke of the handle. A stud 127 fixed to the outer frame plate 21 projects through a slot 128 formed in the link 126 and guides the link for forward and rearward movement. The link 126 is connected at its forward end to a depending arm 130 (Fig. 5) fixed to a shaft 131 one end of which is journaled in the outer plate 21 and the other end in a bracket 132. Also fixed to the shaft 131 is a depending hook arm 133 (Fig. 2) which is in vertical alignment with the arm 116 of the total key 115. A latch 134 (Fig. 3) pivoted at 135 to the link 126 has a spring 136 connected thereto which is adapted to normally rock the latch clockwise about its pivot and also urge the link rearwardly. The latch is limited in said rocking movement by the keyboard of the machine and has a depending toe portion 137 adapted to engage an upturned lug 138 secured to the carriage 26.

Formed integral with the bell-crank 119 (Figs. 1, 4, and 9) through a cross bar 140 is a depending arm 141 which has connected thereto the forward end of a rearwardly extending link 142, the rear end portion (Fig. 1) of which is suitably slotted to receive a stud 143, carried by the outer frame plate 20 by which the link is supported and guided. Projecting from the rear end of the link 142 is a lug 144 which is adapted to cooperate with a flange 145 on a keeper plate 146 which plate is secured to the main shaft 44. The construction is such that the link 142 through the cooperation of its lug 144 with flange 145 is prevented from operation during a machine cycle.

Through the escapement mechanism mentioned above the carriage moves to the left one step for each digit key operation. This moves the lug 138 (Fig. 3) away from the toe 137 permitting the link 126, which is guided by the stud 127 in slot 128, to slide rearwardly through the tension of spring 136. Thus the shaft 131 is rocked counter-clockwise positioning the hook of arm 133 in the path of the arm 116 thereby locking the total key from operation.

Toward the end of the forward stroke of the handle the roller 125 engages the rear end of the link 126 rocking the hook arm 133 out of the path of the arm 116 of the total key. However, the total key is prevented from being operated at this time by the flange 145 which is in the path of lug 144. At the beginning of the return stroke of the handle, the link 126 is permitted to move rearward, but, since the carriage return mechanism is so timed that the carriage is not returned to normal till near the completion of the machine cycle, the lug 138 permits the link 126 to move its full distance rearward. Therefore, it is seen that the total key is locked against operation after every adding cycle. Upon taking a blank stroke the link 126 is moved forwardly so that the toe 137 of latch 134 engages lug 138, which has returned to normal at the end of the preceding cycle, thereby permitting operation of the total key in the next succeeding cycle of the machine.

The machine thus far described constitutes part of the usual Monarch computing machine hereinbefore referred to which is disclosed in the above mentioned patents.

ITEM DIAL MECHANISM (Figs 1, 2, 7, 8, and 11)

As has been described above the purpose of the item dials is to indicate positive and negative items entered into the accumulator and also to indicate positive and negative totals when the accumulator is cleared.

Each adding rack 32 is provided with a rearwardly extending arm 150 having a downwardly projecting lug 151 formed at its rear end thereof. The lug 151 is adapted to cooperate with a roller 152 mounted uopn a stud 153 which is fixed to a depending arm 154 of a gear sector 155. The sectors 155 are rotatably mounted upon the rod 34 and are spaced apart by spacers 156 and the rear ends of the racks 32. A spring 157 having one end connected to the rear end of the slide 35 and the other end to the arm 154 tends to rotate the sector in a clockwise direction, the sector being limited in such movement by the main shaft 44.

Rotatably mounted upon a shaft 158, having its ends journaled in the inner frame plates 22 and 23, is a plurality of pinions 160 one for each sector 155. Teeth 161 of the pinion 160 are the same in number as the teeth of the accumulator pinion 60 and are in permanent meshing engagement with teeth 162 of the sector 155. Secured to the right of each pinion 160 (Fig. 1) is an item dial 163, the outer periphery of which is provided with a double set of figures in contrasting colors, as for example, in the present machine, black and red, referred to in the drawings as 164 and 165, respectively. As is best seen in Fig. 11, the black figures 164 are indicated in solid lines and the red figures 165 are indicated in dotted lines. All of the figures run from "0" to "9" and are arranged so that each black figure has directly above it a red figure which is the complement of the black figure, i. e., the black "9" has above it its complement the red "0"; the black "8", the red "1", etc. A window 166 (Fig. 2) in a casing 167 is provided for visibly displaying the figures on the item dials 163.

SEGMENT LOCK (Figs. 1, 2, 4, 7, and 8)

In order to prevent accidental rotation of the item dials during certain intervals the following locking mechanism is provided.

Figure 4:
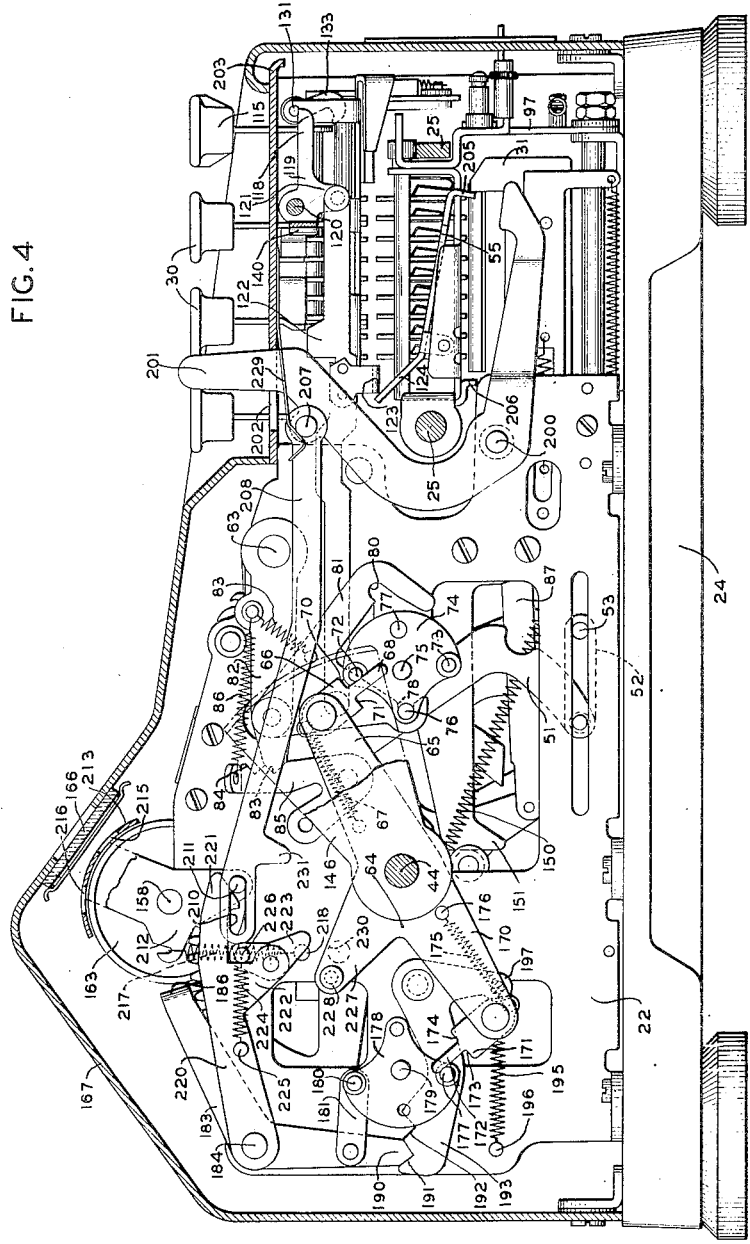
Fig. 4 is a left-hand elevational view of the machine just inside the cover showing the subtract key and its associated mechanism.

Referring to Figs. 1 and 4, formed integral with the lever 64 is a second arm 170 which extends downwardly and rearwardly and which has mounted upon its rear end a wipe pawl 171. This pawl is formed with a finger 172 and two shoulders 173 and 174. The pawl is urged in a counter-clockwise direction by a spring 175 having one end thereof connected to a pin 176 fixed to the arm 170 and the other end to a pin on the pawl. The finger 172 extends upwardly and rearwardly from the arm 170 and engages a pin 177 fixed to a plate 178, which plate is rotatably mounted upon the stud 179 fixed to inner plate 22. The plate 178 has another pin 180 secured thereon which extends through the plate 178 and has connected thereon the forward end of a rearwardly extending link 181. The rear end of the link 181 is connected to a downwardly extending arm of a two-armed lever 183 rotatably mounted upon a stud 194 secured to the inner frame plate 22. The other arm of the lever 183 extends toward the front of the machine and is formed at its front end with a bail bar 186. This bar extends transversely across the machine and is integral at its other end with another arm 187 (Fig. 1) pivotally mounted upon a stud 188 secured to the inner frame plate 23. The bar 186 is adapted to engage the teeth 162 of the sector 155 to prevent the sector from being rotated. Referring to Fig. 4 the downwardly extending arm of lever 183 is formed at its lower end with a V-shaped nose 190 adapted to engage notches 191 and 192 formed in a rearwardly extending arm 193 of a two-armed lever. The lever is urged in a clockwise direction by a spring 195 having one end thereof connected to a stud 196 on the inner frame plate 22 and the other end connected to the other arm 197 thereof.

The construction is such that if, for example, "four" is set up on the pin carriage 26 by depressing the number "four" key, and the handle 38 is brought forward, the main shaft 44 is rocked in a clockwise direction (Fig. 4), thereby rocking the arm 170 clockwise. The finger 172 of the wipe pawl 171 mounted on the arm 170 rides on the pin 177 of plate 178 until the shoulder 173 of the pawl engages the pin. Further movement of the arm 170 forces the pin 177 rearward, thereby rocking the plate 178 clockwise. This will, through link 181, rock the lever 183 clockwise until the nose 190 of the downwardly extending arm engages the notch 192 where it will remain during the remainder of the forward movement of the handle 38. The rocking of the lever 183 (Fig. 7) will move the bail 186 out of locking engagement with the teeth 162 of the gear segments 155, thereby permitting the segments to be rocked as will be described presently.

The forward movement of the handle 38 also rocks the shaft 50 counter-clockwise (Fig. 2), thereby moving the bail 53 rearward along slots 54 to permit the adding rack 32 and the slide 35 of the lowest denominational order to move towards the rear of the machine until it is arrested by the depressed pin 28 in the pin carriage. Immediately upon the start of the rearward movement of the rack, the lug 151 thereon engages the roller 152 on the sector 155 and rotates the sector in a counter-clockwise direction (Fig. 2) against the tension of the spring 157. The sector 155 being in permanent meshing engagement with the pinion 160 rotates the pinion clockwise a distance of "four" tooth spaces. This positions the item dial 163 so that a black "4" on the dial is visible through the window 166 in the casing 167.

Near the beginning of the return stroke of the handle 38 the shoulder 174 (Fig. 4) on the wipe pawl 171 engages the pin 180 on the plate 178 and rocks the plate counter-clockwise until nose 190 engages notch 191 on the lever 193. This moves the bail 186 into engagement with the teeth 162 of the sectors 155 locking the sectors from rotation. Immediately following the above operation the racks 32 are returned to normal position by the bail 53 (Fig. 8).

SUBTRACT KEY MECHANISM (Figs 1 and 4)

In the present machine subtraction is accomplished by complementary addition, i. e., the complement of the amount to be subtracted (or the subtrahend) is added in the accumulator.

Referring to Fig. 1 the digit keys 30 are each provided with two figures complemental to each other. The large figures are used for positive amounts and the small figures are used for negative amounts. Such arrangement is old and well known and need not be further described herein.

Pivotally mounted upon a stub shaft 200 (Fig. 4) fixed to the inner frame plate 22 is a subtract key lever 201 which extends upwardly through a slot 202 of the keyboard plate 29. The lever 201 extends forwardly and inwardly and is adapted to engage a toe 205 of the restraining plate 55. When the subtract lever 201 is rocked counter-clockwise the forward portion thereof raises the forward edge of the plate 55 permitting those racks which are normally restrained by the plate, during normal adding operations, as was previously described, to be moved toward the rear of the machine until they are arrested by the "nine" stop 206 fixed to the pin carriage 26.

From the foregoing it will be seen that if, for example, a negative amount "275" is set up on the keyboard by using the small figures on the digit keys 30 and the subtract lever 201 is operated, then the amount actually set up on the carriage 26 will be "999999724" which amount is then added into the accumulator.

The transfer pawl 102 associated with the pinion of highest order is secured to the shaft 49 (Fig. 1). Thus, the shaft 49 is rocked in a clockwise direction (Fig. 2) each time that the pinion of highest order rotates from 9 to 0. Also secured to the shaft 49 is a transfer pawl 109 located adjacent the rack 32 of lowest order. The pawl 109 is similar to the pawls 102 and is so arranged that when the shaft 49 rocks in a clockwise direction (Fig. 2), as described above, the rack 32 of lowest order is permitted to move forward one tooth space which movement is transmitted to the pinion of lowest order. Therefore, when the pinion of highest order moves from 9 to 0 one is entered in the pinion of lowest order.

Connected to the subtract key lever 201 by a stud 207 (Figs. 1 and 4) is a rearwardly extending link 208. The rear end of the link 208 is provided with a slot 210 through which passes a pin 211 secured to a depending arm 212 of a dial shield or shutter 213. The shutter is U-shaped (Fig. 6) and is pivoted upon the ends of the shaft 158, one end passing through the arm 212 at the left and the other end through an arm 214 at the right. The shutter extends longitudinally of the item dial pinions and is provided at its top portion with two elongated slots or openings 215 and 216 through which the black and red figures 164 and 165 on the item dials 163, as referred to above, are visible. A spring 217 (Fig. 4) having one end connected to the arm 212 of the shutter 213 and the other end to a stud 218 fixed to the inner frame plate 22, urges the shutter in a counter-clockwise direction.

Pivotally mounted upon the shaft 184 is a forwardly extending arm 220 which is formed at its forward end with a hook portion 221 adapted to cooperate with the pin 211 on the arm 212. The arm 220 is also formed with a depending portion 222 on which is pivoted a wipe pawl 223. The pawl 223 is urged in a counter-clockwise direction by a spring 224, one end of which is connected to a pin 225 on the arm 220 and the other end to a pin 226 fixed to the wipe pawl 223. The pin 226 also serves to limit a counter-clockwise movement of the pawl 223. Formed integral with the lever 64 is an upwardly and rearwardly extending arm 227 which is provided with a pin 228 adapted to cooperate with the left-hand edge of the depending portion of the pawl 223. The arm 227 is further provided with a pin 230 which is adapted to cooperate with a depending lug 231 formed on the link 208. A detent spring 229, secured to the underside of the keyboard plate 29, cooperates with the stud 207 and tends to retain the subtract key lever 201 in either the "add" or the "subtract" position.

The above construction is such that when the subtract key lever 201 is operated from its normal "add" position to its "subtract" position, it rotates the shutter 213 through the link 208 in a clockwise direction against the tension of the spring 217. This positions the slot 216 of the shutter so that the red figures 165 on the item dials 163 are visible through the window 166 in frame 167. The pin 211 passes beneath the arm 220 until it is engaged by the hook 221, thereby latching the shutter in its subtract position. On the forward stroke of the handle 38 the pin 228 of the arm 227 engages the depending portion of the pawl 223 thereby lifting the hook out of engagement with the pin 211. The hook portion 221 remains disengaged from the pin 211 until the pin 228 rides past the depending portion of the pawl 223 permitting the hook 221 to again engage the pin 211. Further forward movement of the handle 38 moves the pin 230, on the arm 227, into engagement with the lug 231 of the link 208 and restores the subtract key 201 to normal "add" position. Upon the return stroke of the handle 38, the pin 228, on the arm 227, rocks the wipe pawl 223 in a clockwise direction against the spring 224 until it rides past it permitting the pawl to snap back into normal position through spring 224. The shutter 213 remains in the above "subtract" position until the start of the next adding operation of the machine when the pin 228 again lifts the hook 221 out of engagement with the pin 211, but since at this time the subtract key is in its normal "add" position, the shutter is allowed to return to its normal "add" position by the spring 217.

In order to release the regular blank stroke lock whenever the subtract key is operated to "subtract" position the following mechanism is provided.

Referring to Figs. 1 and 10 the right-hand arm 214 of the shutter 213 is connected at its lower end to a forwardly extending link 232 which link is connected at its forward end to an upright arm 233. This arm is formed integral with an upwardly and forwardly extending arm 234 by a bail 235. The assembly consisting of the arm 233, arm 234, and the bail 235 is mounted for rotation upon a short stub shaft 236 extending inwardly from and fixed to the outer plate 21. The forward portion of the arm 234 is adapted to cooperate with a pin 237 on the latch 134.

The construction is such that with the shutter in its "subtract" position (Fig. 10), the arm 234 raises the latch 134 against the tension of the spring 136, permitting the link 126 to move toward the rear of the machine and rock shaft 131 counter-clockwise, thereby moving the hook arm 133 (Fig. 9) into the path of the stem of the total key 115.

General Operation

In order that a clear understanding of the invention may be had, specific illustrations in addition, subtraction having a positive remainder, and subtraction having a negative remainder, are now given.

Assume that the accumulator is cleared and it is desired to add "725," "104" and "368," then the following occurs:

Example of Addition 725
104
368

1197 total

| | Accumulator wheels | Item dials |
|---|---|---|
| 1st operation | 000000725 | 000000725 |
| 2nd operation | 000000829 | 000000104 |
| 3rd operation | 000001197 | 000000368 |
| Blank stroke | 000001197 | 000000000 |
| Total | 000000000 | 000001197 |

From the above illustration, it will be understood that the item dials are cleared at the beginning of each new operation of the machine and the new item set up toward the end of the forward stroke. Referring now to subtraction by complementary addition having a positive remainder, assume that the accumulator is cleared and it is desired to subtract "275" from "380," then the following occurs:

Examples of Subtraction (Positive Remainder)

380 minuend
275 subtrahend
105 remainder

| | Accumulator pinions | Item dials |
|---|---|---|
| 1st operation | 000000380 | 000000380 |
| 2nd operation | 000000105 | 000000275 (red) |
| Blank stroke | 000000105 | 000000000 |
| Total | 000000000 | 000000105 |

Tracing again the example above, showing a positive remainder, the first item (or the minuend) is set up in the keyboard by depressing "380" using the large figures on the digit keys 30. Therefore, after the first operation of the machine, 000000380 will be entered in the accumulator pinions 60 and 000000380 will appear in the item dials through window 166.

The second item (or the subtrahend), which in this example is a subtracted amount, is set up in the keyboard by depressing "275" using the small figures on the digit key 30, and operating the subtract key lever 201. Thus the amount actually set up on the pin carriage is 999999724 and when this is added to the 000000380 amount in the accumulator pinions the fugitive one is carried from the highest order to the lowest order and 000000105 will be the amount stored in the accumulator pinion after the second operation of the machine, and the red figures 000000275 will appear in the item dials showing the amount subtracted or the subtrahend.

A blank stroke is then taken which clears the item dials and retains 000000105 in the accumulator pinions. The total key 115 is then depressed which clears the accumulator pinion and transfers the positive total of 000000105 to the item dials which appears in black figures through window 166 in the casing 167.

Referring now to subtraction by complementary addition having a negative remainder, assume that the accumulator is cleared and it is desired to subtract "450" from "375," then the following occurs:

EXAMPLE OF SUBTRACTION (NEGATIVE REMAINDER)

375 minuend
    450 subtrahend
    −75 remainder

|  | Accumulator pinions | Item dials |
|---|---|---|
| 1st operation | 000000375 | 000000375 |
| 2nd operation | 999999924 | 000000450 (red) |
| Blank stroke | 999999924 | 000000000 |
| Total | 000000000 | 000000075 (red) |

Tracing again the example above, showing a negative remainder, the first item (or the minuend) is set up in the keyboard by depressing "375" using the large figures on the digit keys. Therefore, after the first operation of the machine 000000375 will be stored in the accumulator pinions and 000000375 will appear in the item dials.

The second item (or the subtrahend) which in this example is a subtracted amount is set up in the keyboard by depressing 450 using the small figures on the digit keys (or complements of the large figures) and depressing the subtract key. Thus the amount actually set up in the pin carriage is 999999549 and when this amount is added to the 000000375 amount in the accumulator pinions no carry-over takes place and 999999924 is in the accumulator pinions after the second operation of the machine, and 000000450 will appear in the item dials showing the amount subtracted or the subtrahend. A blank stroke is then taken which clears the item dials and retains the 999999924 in the accumulator pinions. The total key is then depressed which clears the accumulator pinions and transfers the 999999924 therein into the item dials. The operator recognizes the above amount as being negative and operates the subtract key so that the complement of 999999924 which is 000000075, the correct total, may be read in red on the item dials.

While I have described what I consider to be highly desirable embodiments of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a computing machine of the class described, a plurality of item dials having one set of positive and one set of negative figures thereon, a shutter movable to an add position to expose said positive set of figures and to a subtract position to expose said negative set of figures, a subtract key capable upon depression thereof of conditioning said machine for subtraction, moving means operable upon depression of said subtract key to move said shutter to said subtract position, a latch for holding said shutter in the said subtract position, a main operating mechanism, and means operable by said main operating mechanism to disable said latch.

2. In a computing machine of the class described, a plurality of item dials having one set of positive and one set of negative figures thereon, a shutter movable to an add position to expose said positive set of figures and to a subtract position to expose said negative set of figures, a subtract key capable upon depression thereof of conditioning said machine for subtraction, moving means operable upon depression of said subtract key for moving said shutter to said subtract position, a main operating mechanism, means operable by said main operating mechanism for actuating said moving means to restore said subtract key to its undepressed position, and a latch for holding said shutter in said subtract position during the restoration of said subtract key to normal position.

3. In a computing machine of the class described, a plurality of item dials having one set of positive and one set of negative figures thereon, a shutter movable to an add position to expose said positive set of figures and to a subtract position to expose said negative set of figures, a subtract key capable upon depression thereof of conditioning said machine for subtraction, moving means operable upon depression of said subtract key to move said shutter to said subtract position, a latch for holding said shutter in said subtract position, a main operating mechanism, means operable by said main operating mechanism for actuating said moving means to restore said subtract key during the subtraction operation of said machine, additional means operable by said main operating mechanism for disabling said latch during an adding cycle of said machine following a subtraction cycle of same and means effective when said latch is disabled to restore said shutter to its add position.

4. In a computing machine of the class described, a plurality of item dials having one set of positive and one set of negative figures thereon, a shutter movable to an add position to expose said positive set of figures and to a subtract position to expose said negative set of figures, a subtract key capable upon depression thereof of conditioning said machine for subtraction, moving means operable upon depression of said subtract key to move said shutter to said subtract position, a latch for holding said shutter in said subtract position, a main operating mechanism, means operable by said main operating mechanism for actuating said moving means to restore said subtract key, and additional means operable by said main operating mechanism for disabling said latch.

WALTER W. LANDSIEDEL.